United States Patent [19]

Welch

[11] Patent Number: 4,513,421
[45] Date of Patent: Apr. 23, 1985

[54] PERIPHERAL GAIN SUPPRESSION IN A LASER MEDIUM

[75] Inventor: Albert B. Welch, Dallas, Tex.

[73] Assignee: LTV Aerospace and Defense Company, Dallas, Tex.

[21] Appl. No.: 395,847

[22] Filed: Jul. 6, 1982

[51] Int. Cl.³ ............................................... H01S 3/10
[52] U.S. Cl. ............................................ 372/24; 372/99; 372/108; 372/26; 372/66; 372/20
[58] Field of Search .................... 372/19, 20, 99, 98, 372/24, 108, 66, 34, 26, 74; 350/96.15

[56] References Cited

U.S. PATENT DOCUMENTS

| | | | |
|---|---|---|---|
| 3,445,826 | 5/1969 | Myers | 372/19 |
| 3,473,864 | 10/1969 | Garbuny | 372/24 |
| 3,530,401 | 9/1970 | Garbuny et al. | 372/26 |
| 3,555,454 | 1/1971 | Myers et al. | 372/99 |
| 4,283,113 | 8/1981 | Eden | 350/96.15 |

Primary Examiner—William L. Sikes
Assistant Examiner—Léon Scott, Jr.
Attorney, Agent, or Firm—Stephen S. Sadacca; James M. Cate

[57] ABSTRACT

A method and apparatus for generating a plurality of secondary directional modes within the resonant cavity of a scanning laser oscillator. A first directional mode is generated by directing an electron beam on a variable reflectance end reflector to create a variable position pixel. A pattern of fixed reflectance material is positioned on the surface of the variable reflectance end reflector to generate the secondary directional modes within the resonant cavity. The oscillation threshold for the secondary directional modes is higher than the first directional mode, thereby allowing the first directional mode to have priority over the second directional modes. The second directional modes occupy the regions of the active laser medium of the resonant cavity not occupied by the first directional mode thereby suppressing the gain of the laser medium therein.

15 Claims, 8 Drawing Figures

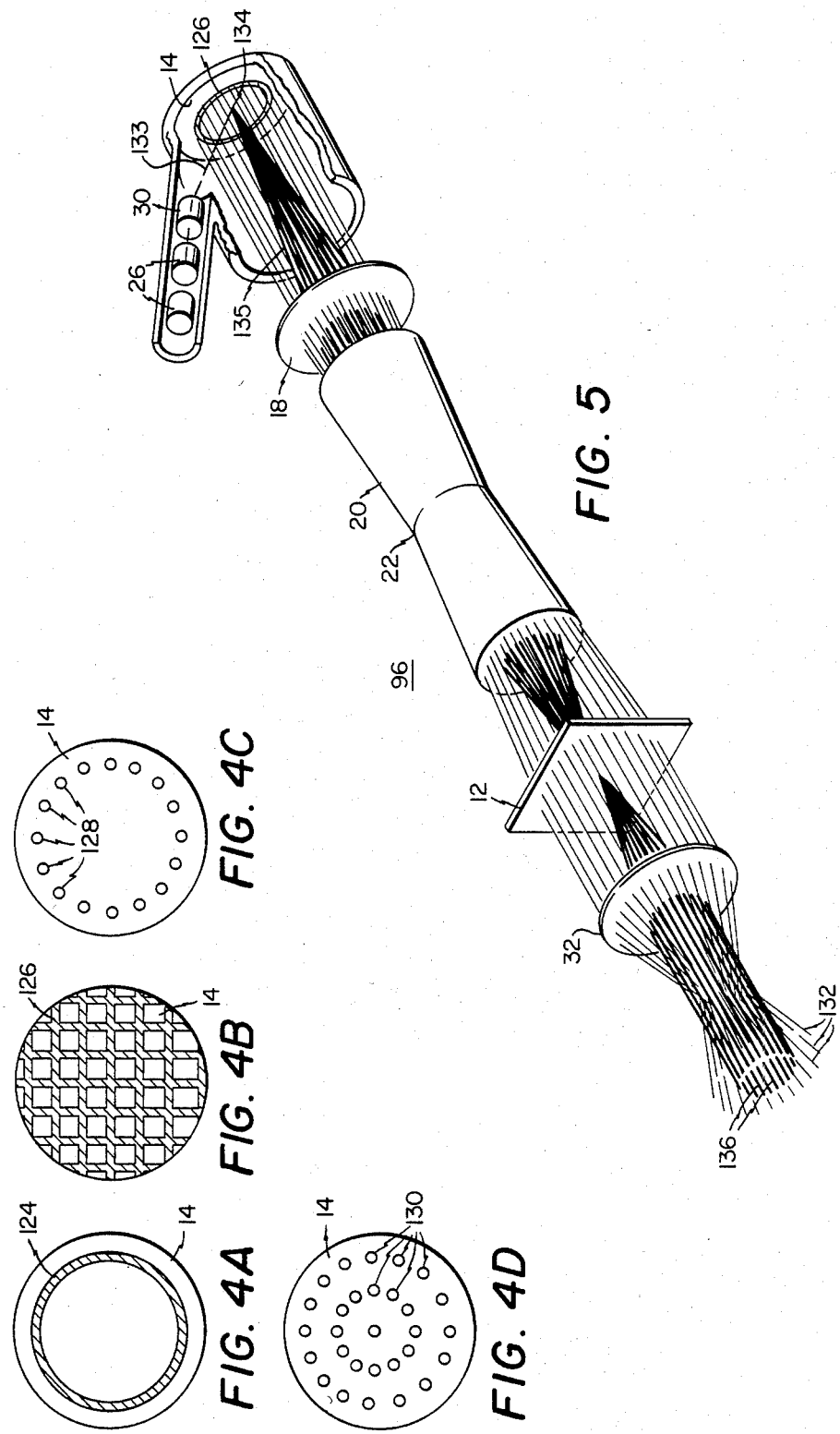

PERIPHERAL GAIN SUPPRESSION IN A LASER MEDIUM

TECHNICAL FIELD

The present invention relates in general to lasers, and more particularly, to a method for controlling the population inversion of the laser medium in a scanning laser.

BACKGROUND OF THE INVENTION

There are basically two modes of operation for laser oscillators, the pulsed mode and the continuous wave (CW) mode. In the CW mode, the laser oscillator outputs a continuous power coherent light beam while the pulsed mode outputs a single burst of coherent light. The design of the resonant cavity and control mechanisms varies somewhat between these techniques. In the pulsed mode laser oscillator the output power can be enormously increased and the pulse duration correspondingly decreased by a technique known as Q-switching. Q-switching allows the resonator cavity of the laser oscillator to go from a high loss state to a low loss state and provides an element of control for the laser. In order to Q-switch a pulsed laser, a very high population inversion must be allowed to build up in the active medium prior to generation of an oscillatory mode. Q-switching involves making the resonator losses sufficiently high to prevent oscillation during a portion of the pump cycle, thus attaining a strong inversion, and then rapidly making the losses very small so that a large amplification is suddenly realized. The large amount of available energy stored in the laser medium is then discharged explosively within a few nanoseconds. The energy in the pulse is limited to the amount of energy that can be stored in the fully excited medium.

As an example, an ordinary laser might generate 100 mJ over a time interval of 100 microseconds for a peak power (averaged over this time interval) of 1000 W. The same laser Q-switched might emit 80 mJ in a single 10 nanosecond pulse for a peak power of 8 mW. The term Q-switching is used by analogy to the Q of an electric circuit. By lowering the Q of the optical cavity, the laser cannot oscillate, and a large inverted population builds up. When the cavity Q is restored, a single giant pulse can be generated.

In a non-Q-switched laser, each active line is cycled between energy levels several times during the typical pulse duration of a few hundred microseconds. Thus, considerably more total energy is emitted in this mode of operation than in the Q-switch mode in which the pulse duration is too short for de-excited ions to be repumped.

Four main types of Q-switching that have been employed in the prior art are the electro-optical, the rotating prism or mirror, the acousto-optical, and the saturable absorber. These techniques are further explained in Fink, et al, "Electronic Engineers Handbook", (1st ed., 1975) McGraw-Hill, page 1119, and Skolnik, "Radar Handbook", (1970), McGraw-Hill, page 37–30. In addition, a technique of controlling Q-switching in a pulsed laser is described in U.S. Pat. No. Re. 29,421, for a system that selectively varies the threshold of oscillation to select the gain of the laser cavity. The amount of power in the laser output is proportional to the amount above the threshold that the population inversion had reached prior to Q-switching. By varying the ratio of the oscillation threshold to the power stored in the laser medium, successive pulses can be equilibrated.

In a CW laser, as compared to the Q-switched laser, the laser medium is continually pumped to maintain a population inversion above the threshold in order to sustain an oscillation. By adjusting the reflectivity of the end mirrors in the resonant cavity, the round trip loss can be reduced to provide a higher laser output. This is essentially a method for adjusting the Q of the resonant cavity rather than switching it. As long as the laser medium is designed to accommodate a population inversion sufficient to maintain power to the coherent light beam, the resonant cavity will continue to oscillate. Techniques similar to those used in pulsed lasers can be utilized in the CW lasers to initiate oscillation.

In scanning lasers it is desirable to switch the position of the coherent light beam within the resonant cavity. This results in an unused portion of the laser medium being turned on, or Q-switched for each new beam position selected. As the output of the scanning laser is scanned across the field of view, the scanning rate can be as high as $10^5$ beam positions per second. This requires portions of the laser medium to make a transition from the high loss, low Q state to the low loss, high Q state for each beam position. As the laser medium is switched to a new beam position, it always oscillates in a mode that provides the lowest round trip loss, or highest Q, in the resonant cavity. When the new beam position is initially turned on with the use of a Q-switch, the resonant cavity changes from a high loss, low Q state, to a low loss, high Q state. During this transition from the high loss to the low loss state, there is a potential for the laser oscillator to lock into a spurious mode. This is due to the very high small signal gain in the laser medium when the laser cavity is in the high loss state with the Q-switch off.

To reduce the probability for spurious oscillations during switching in a scanning laser requires a Q-switching method that reduces the small signal gain of the laser medium when the Q-switch is off. This in turn reduces the potential for spurious mode oscillations when the cavity makes the transition from a high loss to a low loss state.

SUMMARY OF THE INVENTION

The present invention disclosed and claimed herein comprises a method for controlling population inversion in a laser oscillator. A laser medium is pumped to create a population inversion that is capable of sustaining a continuous wave oscillation. A first longitudinal mode is generated within the oscillator at a first oscillation threshold. A plurality of secondary longitudinal modes are generated at a second oscillation threshold that is higher than the first oscillation threshold. The secondary longitudinal modes reduce the gain of the laser medium below the maximum in areas not occupied by the first longitudinal mode.

In accordance with another aspect of the present invention a laser generator is disclosed that is comprised of a laser medium, means for generating a first longitudinal mode at a first oscillation threshold and means for generating a plurality of secondary longitudinal modes at a second oscillation threshold. The first oscillation threshold is lower than the second oscillation threshold such that the first longitudinal mode has priority over the secondary longitudinal modes. The secondary longitudinal modes occupy the regions of the laser medium not occupied by the first longitudinal mode, thus suppressing the gain of the laser medium.

BRIEF DESCRIPTION OF THE DRAWINGS

For a more complete understanding of the present invention and the advantages thereof, reference is now made to the following description taken in conjunction with the accompanying drawings in which:

FIG. 4a is a planar view of a modified control reflector having an annular ring pattern;

FIG. 4b is a planar view of a modified control reflector having a mesh network pattern;

FIG. 4c is a planar view of a modified control reflector having a mesh network pattern;

FIG. 4d is a planar view of a modified control reflector having a plurality of fixed pixels disposed randomly; and FIG. 5 is an isometric view of a scan laser with a modified control reflector.

DETAILED DESCRIPTION OF THE INVENTION

Figure 1:
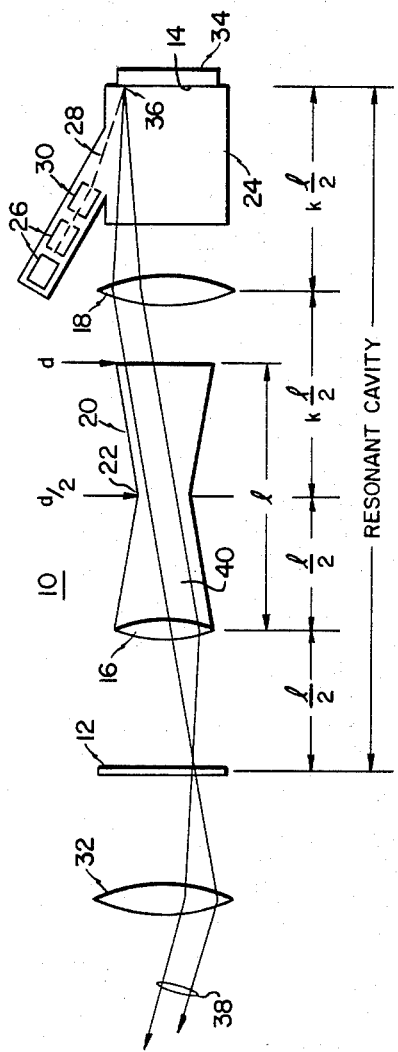
FIG. 1 is a schematic diagram of a scan laser.

Referring now to FIG. 1, there is shown a schematic diagram of a scan laser 10. The resonant cavity for the scan laser 10 is the distance between an output reflector 12 and a control reflector 14. A convex lens 16 is disposed within the resonant cavity a distance of one focal length of the convex lens 16 from the output reflector 12. A second convex lens 18 is disposed within the resonant cavity a distance of one focal length of the second convex lens 18 from the control reflector 14. The distance between the first and second convex lenses 16 and 18, respectively, is equal to the sum of their respective focal lengths.

A laser medium 20 having a length equal to twice the focal length of the convex lens 16 is disposed between the first and second convex lenses 16 and 18, respectively, and adjacent to the first convex lens 16. The laser medium 20 is configured to have a circular cross section with a decreasing diameter from both ends thereof to a position central thereof forming a constrictive neck portion 22. The neck portion 22 has a diameter that is one-half the diameter of the end portion of the laser medium 20.

An off-axis cathode ray tube 24 surrounds the control reflector 14. An electron gun 26 generates an electron beam 28 that is deflected by a deflecting coil 30. The electron beam 28 impinges upon the surface of the control reflector 14 in a selected small area defined by the deflection of the deflection coil 30.

A collimating lens 32 is placed outside the resonant cavity a distance of one focal length of the collimating lens 32 from the output reflector 12. The collimating lens 32 receives the output from the output reflector 12 and collimates the light rays therefrom.

The control reflector 14 is fabricated with a thin film of vanadium dioxide ($VO_2$). The change in optical properties of $VO_2$ as a function of temperature forms the mechanism of operation for the scan laser 10. Below 67° C., $VO_2$ is a dielectric and is transmissive to a wide band of wavelengths in the infrared, including the 10.6 micrometer region. $VO_2$, however, undergoes a phase change to a metallic state and becomes a good reflector, approximately 85%, for 10.6 micrometer radiation above 67° C. If the temperature of the film is initially well below the transition value, and it is heated, the film reflectance abruptly increases at temperatures above the critical value. On cooling, the reflectance relaxes and the $VO_2$ film returns to the transmissive state. In the reflectance state, the control reflector 14 has a reflectance in the 10.6 micrometer range in excess of 96%, whereas the reflectance in the transmissive state is below 20%.

The CRT 24 and the control reflector 14 are configured such that the electron beam 28 is incident on the variable reflectance surface of the control reflector 14. The electron beam 28 creates a localized heating on the surface of the control reflector 14, thereby increasing the reflectance of a small area with a diameter of approximately 350 micrometers. This small spot of reflectance is referred to as a "pixel" 36 which is used in the art to refer to a picture element and will hereinafter be used to refer to a small area of reflectance or a small mirror. A thermal heater 34 is disposed behind the control reflector to adjust the surface temperature thereof for ambient temperature differences.

The active laser medium 20 is an axially flowing DC excited mixture of $CO_2$, $N_2$ and He gases at a total pressure of about 10 torr with a wavelength at 10.6 micrometers. When there is no reflective pixel painted on the control reflector 14, the laser medium 20 has a small signal gain of approximately 2.2 due to the population inversion of the ions resulting from an external pump (not shown). This is the high loss, low Q state. When a signal at the proper frequency travels through the laser medium 20 the ions are reduced to the ground state producing a coherent output light beam 38.

When the electron beam 28 impinges upon the control reflector 14, the pixel 36 is formed, thus creating a high reflectance spot on the surface of the control reflector 14. The combination of the output reflector 12 and the pixel 36 creates an optical feedback path to sustain an oscillation in the resonant cavity of the scan laser 10. When the electron beam 28 is not present, the reflectance of the control reflector 14 is around 20%. This creates a very low Q cavity that has a round trip loss higher than the gain of the laser medium 20.

When the electron beam 28 is present, the coherent light that is output from the laser medium 20 to the second convex lens 18 is focused on the pixel 36. The pixel 36 reflects the focused light in a diverging pattern due to spectral reflection and transmits it back through the convex lens 18. The convex lens 18 converts the diverging light from the pixel 36 to a collimated beam 40. The collimated beam 40 passes through, and is amplified by, the active medium, 20 and is condensed by the first convex lens 16 onto the output reflector 12, thus completing the optical feedback path. As the collimated beam 40 passes through the active laser medium 20, the gain of the active laser medium 20 along the optical path is reduced. The threshold condition for establishing laser oscillations in any optical resonator is reached when the gain of the optical traveling wave passing through the laser medium just balances the loss associated with the resonator. With the output reflector 12 having a reflectivity of approximately 70%, and the pixel having a reflectivity of approximately 96%, the overall associated gain of the oscillator must be approximately 1.15 to sustain oscillations within the resonant cavity.

The necked-down shape of the active laser medium 20, as described above, maximizes mode filling efficiency and, by defining the mode diameter, provides uniform power output for all beam directions. The collimated light beam 40 that is generated in the resonant cavity traverses a cylindrical path through the laser medium 20. This allows the optical path traversed by the coherent light beam 40 to occupy an equal portion of the active laser medium, regardless of the position of the pixel 36. In a cylindrical laser medium, on the other hand, a coherent light beam entering along the central axis of the cavity occupies the full diameter of the laser medium, whereas a coherent light beam entering at an angle greater than 0 degrees with respect to the central axis occupies a lesser amount of the active medium, with the result that a lower output power beam is output by a cylindrical laser medium for angles off the central axis thereof.

The pixel 36, that is created on the surface of the control reflector 14 by the electron beam 28, absorbs a small percentage of the power in the resonant cavity of the scan laser 10. This absorbed power causes some localized heating, thus increasing the size of the pixel 36. Optimization of power and intensity with existing $VO_2$ technology is achieved in several ways. The size of the pixel 36 at the control reflector 14 can be increased by utilizing a lens of longer focal length ($K>1$) for the second convex lens 18, to decrease the power density and temperature rise at the control reflector 14.

The number of beam positions, or directional modes, is proportional to the square of the cross-sectional area to length ratio of the laser medium 20. For example, to achieve 100,000 beam positions in a $CO_2$ scan laser, the "gain medium" must be 2.5 or 3 centimeters in diameter at the neck portion 22, and 30 or 40 centimeters in length. Output power for a wall stabilized $CO_2$ laser decreases rapidly with increasing laser diameter and increases with increasing length.

Figure 2:
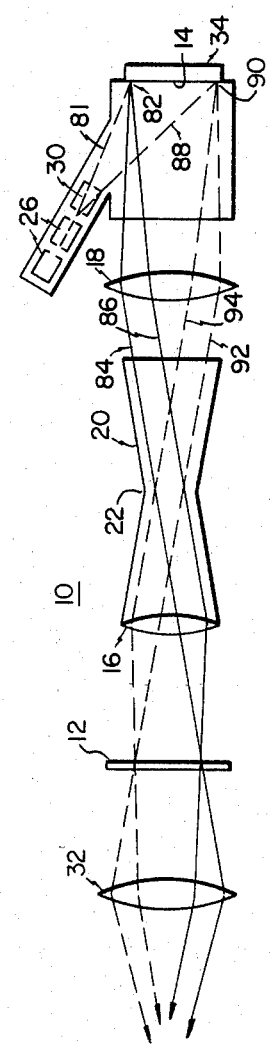
FIG. 2 is a schematic diagram of a scan laser having two beam positions.

Referring now to FIG. 2, there is shown the scan laser 10 of FIG. 1 having two beam positions illustrated. Common numerals are utilized for like and corresponding parts in the two figures. An electron beam 81 is generated by the electron gun 26 and deflected by the deflection coil 30 to generate a pixel 82 on the control reflector 14. As described above with reference to the pixel 36 of FIG. 1, the pixel 82 will reflect light to generate an oscillating mode within the resonant cavity of the scan laser 10. The path that incident light reflected from the pixel 82 traverses is defined by light rays 84 and 86. Although shown in cross section, the light rays 84 and 86 define a path for a bundle of light rays that traverse a cylindrical path through the active laser medium 20.

The deflection coil 30 is adjustable to generate a second electron beam 88 that generates a pixel 90. The pixel 90 creates a spectral reflection of light to generate another oscillating mode within the resonant cavity of the scan laser 80, as defined by the dotted lines. The path traversed by the optical wave for the mode generated by the pixel 90 is bounded by light rays 92 and 94.

When the deflection coil 30 shifts the oscillating mode from the pixel 82 to the pixel 90, the cylindrical volume occupied by the light rays traversing through the active laser medium 20 is substantially different. However, the particular mode within the resonant cavity is similar with the exception of direction. This mode is defined as a directional mode. The population inversion within the cylindrical volume of the laser medium 20 traversed by any given directional mode is reduced to a level that can sustain an oscillation. This level is substantially lower than the population inversion of the laser medium not occupied by the directional mode. When the pixel 82 is removed and the pixel 90 is created, the directional mode changes position within the active laser medium 20. Although the neck portion 22 is traversed by all modes within the active laser medium 20, the new directional mode generated by the pixel 90 occupies a substantially different portion of the active laser medium 20 at either end thereof.

The population inversion, or the gain, of the laser medium 20 is initially very high and this is normally termed the small signal gain of the laser medium 20. As the oscillations build up, the population inversion and the gain decrease until a stable oscillating mode is obtained. During this time, there is the potential for spurious oscillating modes to be generated due to the high small signal gain. When the control reflector 14 makes the transition from the hot state, having a reflectance of 96%, to the cold state, having a reflectance of less than 20%, the population inversion of the laser medium 20 increases. As this population inversion increases, the threshold to begin oscillation also increases. Although a reflectance of less than 20% at the fundamental mode is sufficient to retard oscillations, there is still the possibility that the reflectance of the control reflector 14 is frequency dependent. If the small signal gain increases sufficiently to allow the laser cavity to oscillate at the cold state reflectance of an off resonance frequency, a spurious oscillation can be generated.

Figure 3:
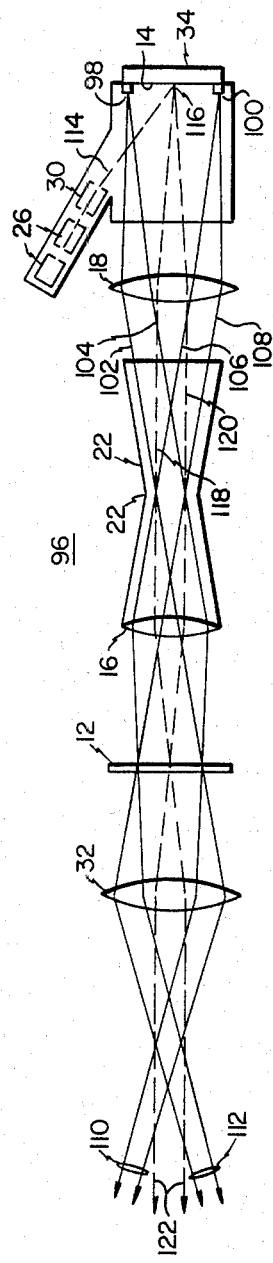
FIG. 3 is a schematic diagram of a scan laser having a modified control reflector.

Now referring to FIG. 3, there is shown a modified scan laser 96 having a modified control reflector 14'. The scan laser 96 is identical to the scan laser 10 of FIG. 1 with the exception of the modified control reflector 14'. Common numerals are utilized for like and corresponding parts in the two figures. On the surface of the modified control reflector 14' there are two permanently affixed reflecting pixels 98 and 100. The reflectivity of the permanently affixed pixels 98 and 100 is approximately 85% for reasons described below. When the electron gun 26 is turned off, so as not to generate a variable position pixel, the permanently affixed pixel 98 sustains an oscillation mode within the resonant cavity of the modified scan laser 96, as defined by the light rays 102 and 104. The permanently affixed pixel 100, in a similar manner, simultaneously generates a second oscillating mode within the resonant cavity of the scan laser 96, as defined by the light rays 106 and 108. The permanently affixed pixel 98 generates an output beam 110 and the permanently affixed pixel 100 generates an output beam 112. The output beams 110 and 112 have equal power, each having one-half the power that would be generated by either the permanently affixed pixel 98 or the permanently affixed pixel 100 alone.

When the electron gun 26 is activated, an electron beam 114 creates a pixel 116 on the surface of the control reflector 14'. The reflectivity of the pixel 116 is approximately 96%. This creates an oscillating mode within the resonant cavity of the modified scan laser 96 as defined by the light rays 118 and 120 that are shown as dotted lines in FIG. 3. Since the reflectance of pixel 116 is 96%, the oscillating mode generated by pixel 116 reduces the population inversion within the active laser medium 20 below the threshold for the oscillating modes created by the permanently affixed pixels 98 and 100. As the population inversion is reduced below the oscillating threshold for the permanently affixed pixels 98 and 100, these oscillating modes are suppressed in any portion of the laser medium occupied by the directional mode that is generated by the pixel 116. The main directional mode generated by the pixel 116 is defined by light rays 118 and 120. The maximum power of the scan laser 96 is now directed along the path defined by a light beam 122.

The purpose for generating oscillating modes with the permanently affixed pixels 98 and 100 is to reduce the population inversion within the active laser medium 20 prior to creating the pixel 116. This illustrates a main aspect of the present invention, that is, substantial lowering of the level of the population inversion, or the small signal gain, in the portions of the active laser medium 20 not occupied by the main longitudinal mode. To divert the oscillating mode to the pixel 116, the only requirement is that the reflectivity of the pixel 116 be greater than 85%, which is the reflectivity of the permanently affixed pixels 98 and 100. This effectively prevents any spurious oscillations due to extraneous modes that can be generated at the higher population inversions of the active laser medium 20. Also, it reduces the contrast required between the hot state reflectance of the control reflector 14' and the cold state reflectance thereof. In the present embodiment, the requirements for the cold state reflectance are that it be below the reflectivity of the permanently affixed pixels 98 and 100. This effectively reduces the contrast between the cold state reflectance and the hot state reflectance.

It should be understood that the minimum reflectivity can be other than 85%. Depending upon the characteristics of the control reflector 14' material used, a different reflectivity can suffice.

In the scan laser 10 of FIG. 2, only one directional mode occupies the laser medium 20 at any given time whereas the laser medium 20 in FIG. 3 is occupied by more than one directional mode in portions thereof. In order to better understand the conditions that occur in the scan laser 96, a more detailed explanation of the operation of the laser will be undertaken.

The gain saturation in a homogeneously broadened laser medium (e.g. pressure broadened $CO_2$ laser) is given by:

$$\gamma = \frac{\gamma_o}{1 + \frac{I}{I_s}} \text{ cm}^{-1} \quad (1)$$

where:
- $\gamma$ = gain coefficient ($cm^{-1}$)
- $\gamma_o$ = small signal gain coefficient ($cm^{-1}$)
- I = laser intensity in medium (w $cm^{-1}$)
- $I_s$ = saturation intensity of medium (w $cm^{-1}$)

As described above, a laser oscillator exists when radiation feedback is applied by creating a pixel on the control reflector 14 or 14' and the small signal gain exceeds the losses. The round trip small signal gain is given by:

$$G_o^2 = e^{2\gamma_o l} \quad (2)$$

where: l = one way length of the gain medium. The threshold gain for oscillation is given by:

$$G_t^2 = \frac{1}{r_1 r_2} \quad (3)$$

where:

$r_1$ = reflectance of the pixel
$r_2$ = reflectance of the output reflector

For simplicity, assume that other losses are lumped into the reflectance. The condition for oscillation from equations 2 and 3 are:

$$\frac{\ln G_o}{\ln G_t} \geq 1 \quad (4)$$

which is the oscillation threshold.

When the condition for oscillation is met, the intensity in the resonator between $r_1$ and $r_2$ builds up exponentially with time until saturation reduces the gain (equation 1) to a level that is just sufficient to offset the losses or:

$$\ln G_t = \frac{\ln G_o}{1 + \frac{I}{I_s}} \quad (5)$$

Solving equation 5 for intensity:

$$\frac{I}{I_s} = \frac{\ln G_o}{\ln G_t} - 1 \quad (6)$$

which is the oscillating intensity.

Now consider the case where a second source of radiation shares a portion of the gain medium with the already present directional mode. The total gain in the resonantor, or resonant cavity, is comprised of the unshared portion R 1 and the shared portion (1−k)l. Following the previous development:

$$\ln G_t = \frac{k \ln G_o}{1 + \frac{I}{I_s}} + \frac{1 - k}{1 + \frac{I_T}{I_s}} \quad (7)$$

where: $I_T$ = total intensity in the shared portion
Solving for the intensity in equation 7:

$$\frac{I}{I_s} = \frac{k}{\frac{\ln G_t}{\ln G_o} - \frac{1 - k}{1 + \frac{I_t}{I_s}}} - 1 \quad (8)$$

It should be noted that the intensity can be brought to zero when the total radiation in the shared portion is sufficiently large and the unshared fraction k is sufficiently small, that is:

$$\frac{I_T}{I_s} < \frac{1 - k}{\frac{\ln G_t}{\ln G_o} - k} - 1 \quad (9)$$

which is the oscillation threshold.

Now consider the source of radiation $I_T$ in the shared medium to consist of several (n) oscillations sharing the same fraction of the same gain medium but with a different threshold gain $G_{t2}$. From equation 8:

$$\frac{n I_2}{I_3} = \frac{nk}{\frac{\ln G_{t2}}{\ln G_o} - \frac{1 - k}{1 + n\frac{I_2}{I_s}}} - n \quad (10)$$

which is the oscillating intensity sum. Solving for intensity:

$$n \frac{I_2}{I_s} = \frac{1}{2} \frac{\ln G_o}{\ln G_{t2}} 1 + k(n-1) - (n+1) + \quad (11)$$

$$\frac{1}{2} \sqrt{\frac{\ln G_o}{\ln G_{t2}} 1 + k(n-1) - (n+1)^2 + 4n\left(\frac{\ln G_o}{\ln G_{t2}} - 1\right)}$$

When equation 11 exceeds the inequality given by equation 9, oscillation is prevented for the oscillator with the threshold $G_t$ by the gain suppression in the shared medium caused by n oscillators with the threshold $G_{t2}$ each contributing $I_2$ to the shared medium. The condition for suppression is:

$$\frac{I_T}{I_s} = n \frac{I_2}{I_s} > \frac{1-k}{\frac{\ln G_z}{\ln G_o} - k} - 1 \quad (12)$$

with $I = 0$.

Examination of equation 11 provides some useful insight. For example, when the number n of oscillators is increased, the total shared intensity reaches a maximum relative to the intensity $I_2$ of a single (n=1) oscillating mode. More specifically:

$$n \frac{I_2}{I_s} \rightarrow \frac{1}{1-k} \frac{I_2}{I_s} \quad (13)$$

when $n \rightarrow \infty$
and $$n \frac{I_2}{I_s} = \frac{I_2}{I_s} = \frac{\ln G_o}{\ln G_{t2}} - 1 \quad (14)$$

when $n=1$ (or $k=1$).
In addition:

$$n \frac{I_2}{I_s} > n\left(\frac{\ln G_o}{\ln G_{t2}} - 1\right) \text{ when } 0 < k < 1 \quad (15)$$

that is, the intensity in the shared medium for n oscillators is greater than n times the intensity from a single oscillator which is because of the contributions from the several unshared portions of gain medium.

It can be shown that, to good approximation, the fraction of the available power in the gain medium occupied by the oscillating radiation that is extracted within the resonator is given by:

$$E_{fc} = 1 - \frac{\ln G_t}{\ln G_o} \quad (16)$$

Substituting $\ln G_o$ from equation 16 in equation 4 with the inequality reversed and using primes to indicate values for the non-oscillating case:

$$\frac{\ln G'_t}{\ln G_t} > \frac{1}{1 - E_{fc}} \quad (17)$$

Using equation 3 to express the result in reflectances provides contrast or ratio of reflectances required to achieve a given efficiency and still turn off the oscillation by reducing reflectance:

$$\frac{r_1}{r'_1} > \left(\frac{1}{r_1 r_2}\right)\left(\frac{E_{fc}}{1 - E_{Fc}}\right) \quad (18)$$

It therefore follows that:

$$\frac{r_1}{r'_1} > (G_o^2) E_{fc}$$

which maintains the efficiency of the fundamental directional mode.

Referring now to FIGS. 4a, 4b, 4c and 4d, there are shown a series of differing patterns that can be superimposed upon the surface of the control reflector 14 of FIG. 1. In FIG. 4a, a reflecting annular ring 124 is superimposed on the surface of a modified control reflector 14. In FIG. 4b, a reflecting mesh network 126 is superimposed upon the surface of the control reflector 14. In FIG. 4c, a plurality of permanently affixed reflecting pixels 128 are disposed about the perimeter of the control reflector 14. In FIG. 4d, a plurality of permanently affixed reflecting pixels 130 are randomly disposed over the entire surface of the control reflector 14.

The line width of the annular ring 124 of FIG. 4a and the line width of the mesh network 126 of FIG. 4b must be sufficiently narrow to cause spectral reflections of incident light in a diverging pattern. The permanently affixed reflecting pixels 128 and 130 of FIGS. 4c and 4d, respectively, also must have a sufficiently small size to reflect incident light as a spectral reflection.

In utilizing the patterns on the control reflector 14, as shown in FIGS. 4a, 4b, 4c and 4d, the available positions for a variable pixel are restricted to the areas not covered by the reflecting patterns. The reflectance of the reflecting pattern must be less than the hot state reflectance of the control reflector 14.

Referring now to FIG. 5, there is shown an exemplary embodiment of the present invention. FIG. 5 illustrates an isometric view of the modified scan laser 96 of FIG. 3 utilizing the annular reflecting ring 126 of FIG. 4a on the surface of the control reflector 14. Common numerals are utilized for like and corresponding parts in the two figures. The annular reflecting ring 126 effectively operates as a continuous ring of individual pixels that are adjacent to each other. A plurality of oscillating modes are generated within the resonant cavity as a result of the annular ring 126. As the annular ring 126 is continuous about the perimeter of the control reflector 14', substantially all of the volume of the active laser medium 20 is occupied by the oscillating modes generated by the annular ring 126. This results in an output beam 132 having a cross-sectional doughnut shape. The output power of the resonant cavity is dispersed over the entire area of the output beam 132 and is equal to the power that an individual pixel having a reflectance equal to that of the annular ring 126 would provide. As the power is dispersed over a large angle, as compared to that generated by an individual pixel, the power per square unit of area is very low.

When the electron gun 26 is activated, an electron beam 133 generates a pixel 134 on the surface of the control reflector 14. A directional mode is thereby generated within the resonant cavity of the scan laser 96, as defined by the plurality of light rays 135. The operation is similar to the operation of the scan laser 10 of FIG. 1.

The directional mode that is generated within the resonant cavity of the laser 96 results in a coherent light beam 136 that is output by the collimating lens 32. The annular ring 126 continues to sustain longitudinal modes within the laser medium 20 in areas not occupied by the light beam 136. In the areas occupied by the light rays 135, the population inversion is lowered below the oscillation threshold of the annular ring 126. The output power due to these modes generated by the annular ring 126 are disposed about the extreme perimeter of the output of the collimating lens 32 and can be extracted by an external array of lens (not shown). This, in effect, maintains the population inversion within the active laser medium 20 at a predetermined level, until the electron beam 133 changes position to generate a new directional mode in a new direction.

It should be understood that any pattern may be superimposed on the surface of the control reflector 14. The only restrictions on this pattern are that it reflect light in a multitude of directions without detracting from the maximum number of beam positions that are required to be generated from the surface of the control reflector 14. Also, the reflectance must be lower than that of the control reflector 14. Although FIGS. 4a, 4b, 4c and 4d show differing embodiments for the pattern that is disposed upon the surface of the control reflector 14, any number of patterns can be utilized.

The main requirement for the reflectivity of the pattern imposed on the surface of the control reflector 14 is that, in the absence of a high reflectance pixel, the reflectivity of the surface be uniform. If the reflectivity of the surface is not uniform then the oscillating mode can potentially lock onto the highest reflectance portion of the pattern.

Although the preferred embodiment of the invention has been described in detail, it should be understood that various changes, substitutions and alterations can be made therein without departing from the spirit and scope of the invention as defined by the appended claims.

I claim:

1. An apparatus for generating a scanning laser beam comprising:
   An active laser medium; means for pumping said laser medium in a resonant cavity to build a population inversion, said resonant cavity including a control reflector having a reflective surface with a fixed uniformly reflecting pattern of material disposed on the reflective surface of said control reflector and having a fixed reflectance so as to sustain optical oscillations at a first population inversion level providing a generally uniform population inversion in said laser medium, and a second pattern of material also disposed on the reflective surface of said control reflector having a reflectance-transmissive state transition responsive to an external stimulation; and means for generating said external stimulation resulting in a selected pattern being formed on said reflective surface producing a reflectance state which maintains optical oscillations at a second population inversion level in said laser medium.

2. The apparatus of claim 1, wherein said means for generating said external stimulation includes an electron beam, and said second material surface with said reflectance-transmissive state transition includes material having a reflectance that varies as a function of localized heating to alter the reflectance of a selected small portion on said reflective surface of said control reflector to reflect incident light in a pattern determined by said electron beam.

3. The apparatus of claim 1, wherein said first fixed pattern is comprised of a pattern of uniformly reflecting material disposed on the surface of said control reflector to reflect incident light in a plurality of diverging light rays.

4. An apparatus for generating a scanning laser beam, comprising:
   an active laser medium;
   means for pumping said laser medium in a resonant cavity to build a population inversion first and second focusing lenses disposed at opposite ends of said laser medium, said first focusing lens parallel to said second focusing lens;
   a partially reflecting surface positioned one focal length from said first focusing lens and parallel to said first focusing lens;
   a variable reflectance surface positioned one focal length away from said second focusing lens and parallel to said second focusing lens;
   a fixed pattern of partially reflecting material of a constant reflectance disposed adjacent the surface of said variable reflectance material and between said second focusing lens and said variable reflectance surface, said pattern selectably covering portions of said variable reflectance surface to produce oscillations in said laser medium effective to produce optical transmission losses which reduce the gain of said laser medium, said reduction of gain resulting from the constant reflectance of said pattern of partially reflecting material; and
   means for selectively varying the reflectance of said variable reflectance surface in selected small portions, wherein the reflectance of said small portions is variable to a value greater than the constant reflectance of said pattern of partially reflecting material such that a lower population inversion defines an oscillation threshold at said greater reflectance value.

5. The apparatus as defined in claim 4, wherein said variable reflectance surface is comprised of a layer of vanadium dioxide.

6. The apparatus as defined in claim 4, wherein said means for selectively varying the reflectance of said variable reflectance surface is comprised of an electron beam generator for focusing on said variable reflectance surface in a selected small area, said variable reflectance surface having a reflectance that is variable as a function of heat produced by an incdent electron beam.

7. The apparatus as defined in claim 4, wherein said pattern of partially reflecting material is configured in a ring shape about the perimeter of said variable reflectance surface.

8. The apparatus as defined in claim 4, wherein said pattern of partially reflecting material is configured in a mesh pattern disposed uniformly across the surface of said variable reflectance surface.

9. The apparatus as defined in claim 4, wherein said pattern of partially reflecting material is configured as a plurality of fixed reflectance pixels disposed about the perimeters of said variable reflectance surface.

10. The apparatus as defined in claim 4, wherein said pattern of partially reflecting material is configured as a plurality of fixed reflectance pixels disposed randomly on the surface of said variable reflectance surface.

11. A method for stabilizing scanning laser operation by controlling population inversion in a laser medium, comprising:
   pumping said laser medium to create a population inversion;
   providing at least one fixed pixel having a first reflectance effective to produce a first oscillating beam with a first threshold population inversion within said laser medium;
   providing at least one scanning pixel having a second reflectance effective to produce a second oscillating beam with a second threshold population inversion less than said first threshold population inversion within said laser medium; and
   said first threshold population inversion having a corresponding gain low enough to inhibit spurious oscillating beams from said scanning pixel.

12. The method of claim 11, wherein the step of providing at least one scanning pixel includes the step of moving a surface area having enhanced reflectance over a reflecting end for said laser medium.

13. The method of claim 12, wherein the step of moving said surface area includes directing an electron beam in a pattern onto a material surface having a reflectance responsive to the incidence of said electron beam.

14. A method for stabilizing scanning laser operation by controlling population inversion in said laser medium, comprising:
   pumping a laser medium in a resonant cavity to build a population inversion;
   providing a fixed predetermined surface pattern having a fixed reflectance;
   generating a first oscillating beam from said fixed reflectance pattern to produce a first threshold population inversion in a first volume of said laser medium;
   generating a moving small surface segment having a second reflectance; and
   generating a second oscillating beam from said moving surface to produce a second threshold population inversion less than said first threshold population inversion to deliver power from said laser medium traversed by said second oscillating beam in a pattern determined by said moving small surface segment.

15. The method of claim 14, wherein the step of generating a moving small surface segment includes directing a scanning electron beam onto a material surface having a reflectance responsive to the incidence of said electron beam.

* * * * *